March 18, 1958   C. B. GREESON ET AL   2,826,886
TRACTOR MOUNTED DISK HARROW

Filed June 29, 1953   5 Sheets-Sheet 1

INVENTORS
CLARETT B. GREESON
THOMAS T. ROSSEBO
BY

Soans, Glaister & Anderson
ATTORNEYS

INVENTORS
CLARETT B. GREESON
THOMAS T. ROSSEBO
BY

Soans, Glaister & Anderson
ATTORNEYS

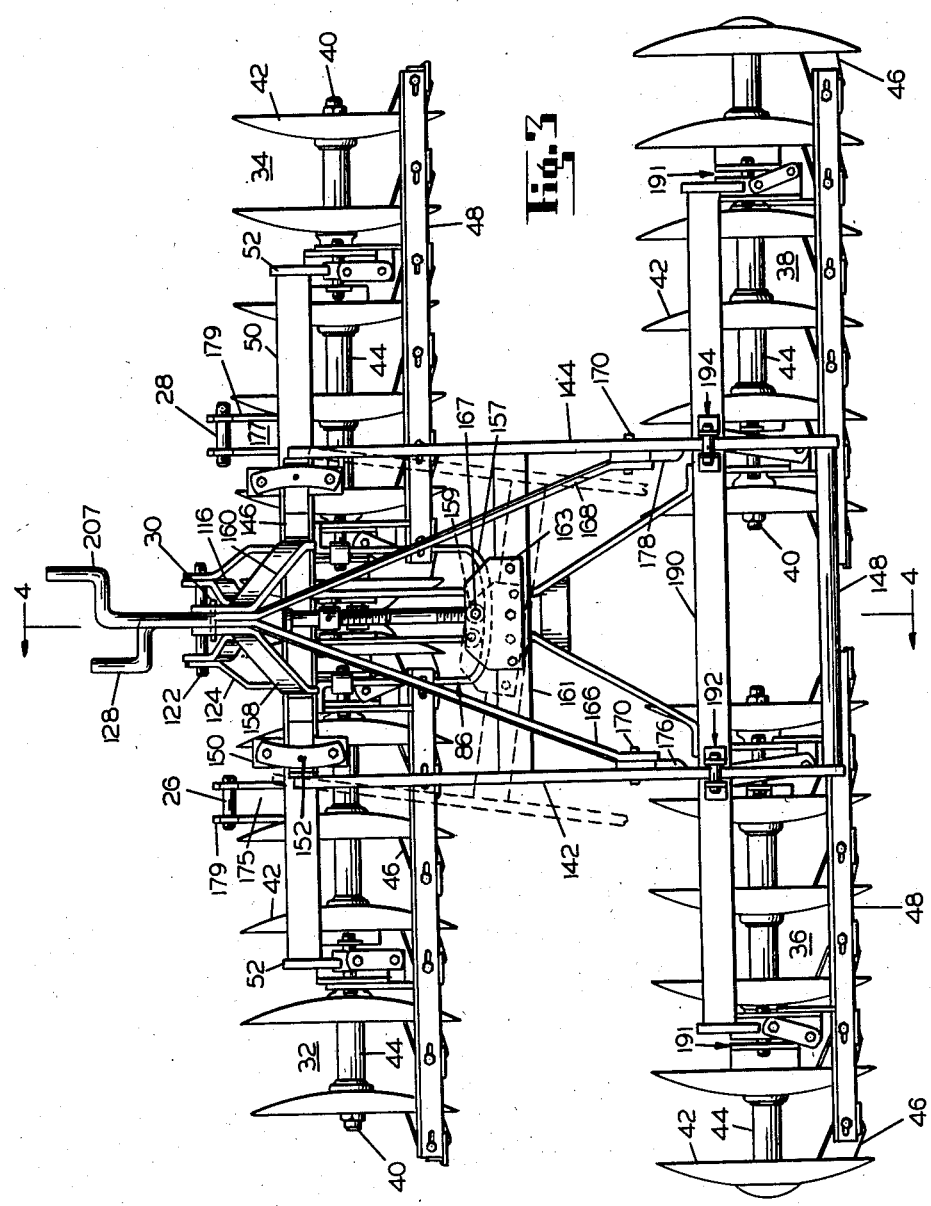

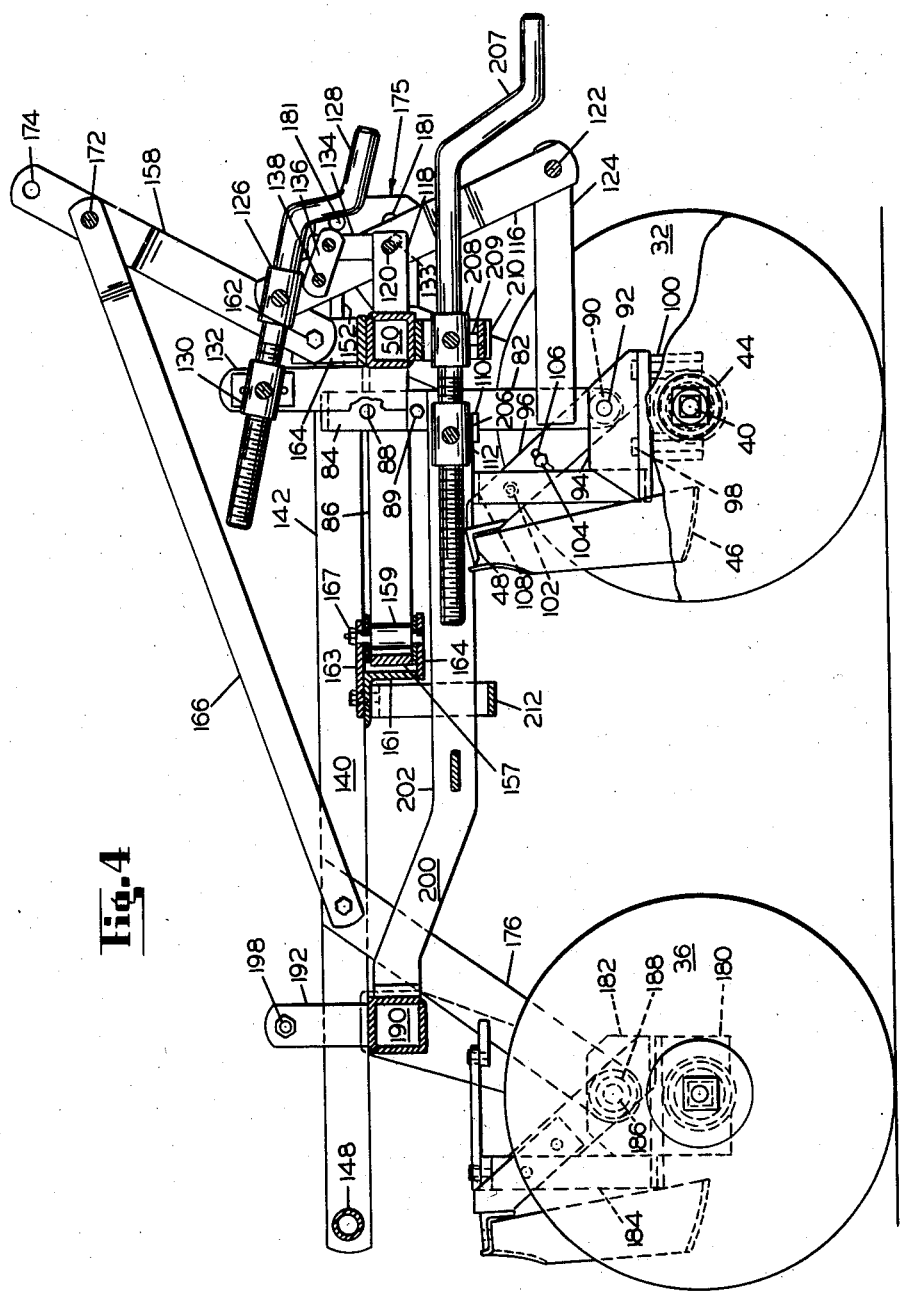

March 18, 1958 C. B. GREESON ET AL 2,826,886
TRACTOR MOUNTED DISK HARROW
Filed June 29, 1953 5 Sheets-Sheet 5
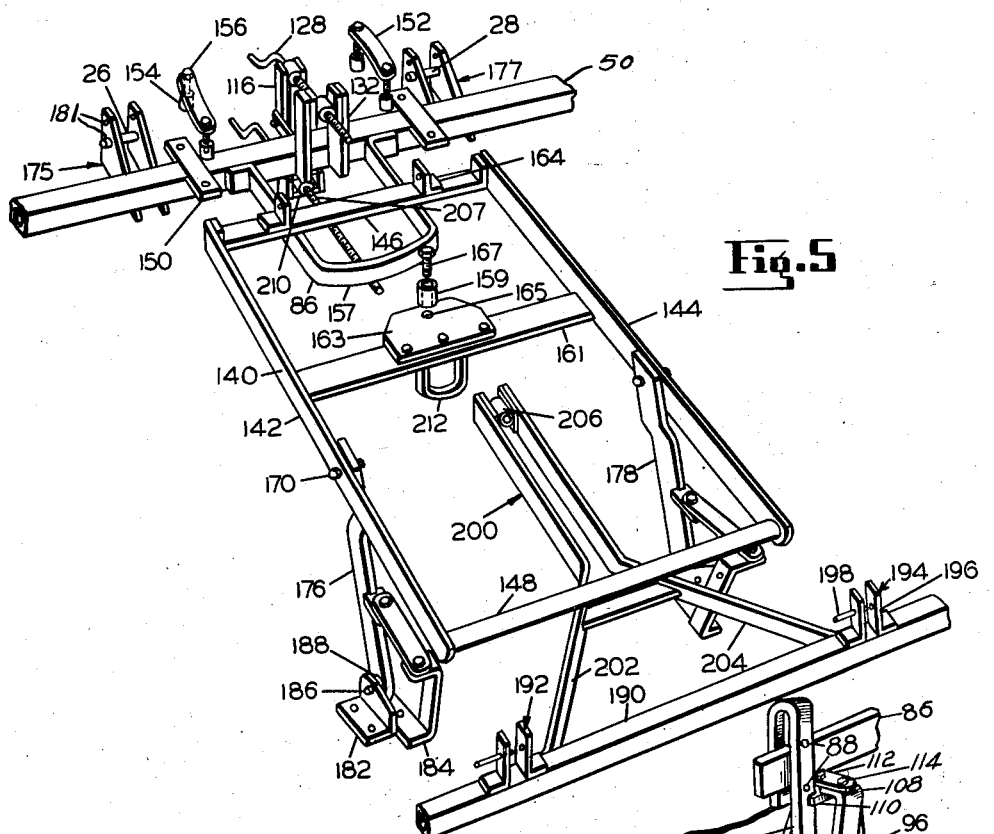
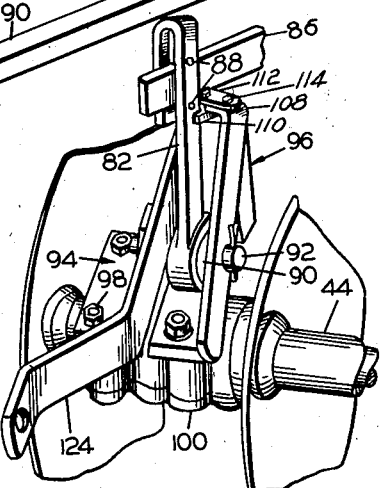
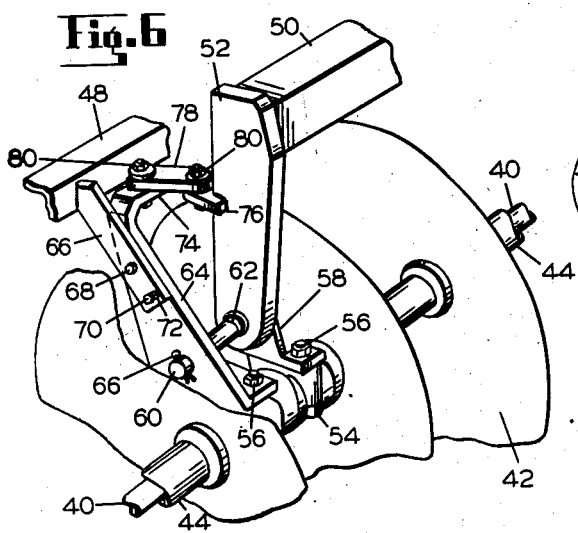
INVENTORS
CLARETT B. GREESON
THOMAS T. ROSSEBO
BY
ATTORNEYS United States Patent Office 2,826,886
Patented Mar. 18, 1958

2,826,886

TRACTOR MOUNTED DISK HARROW

Clarett B. Greeson and Thomas T. Rossebo, Rockford, Ill., assignors to J. I. Case Company, Racine, Wis., a corporation of Wisconsin Application June 29, 1953, Serial No. 364,642

12 Claims. (Cl. 55—83)

The present invention relates generally to farm machinery, and is particularly directed to tractor mounted disk harrows of the type adapted for connection with power operated lift mechanism on the tractor for movement from a ground working position to an elevated transport position.

Among the more recent developments in the field of farm machinery are included tractor mounted disk harrows which are capable of being elevated above the ground, as a unit, to provide for easier and speedier transport of the harrow from one site of operation to another. For the most efficient operation, it is important that the implement be closely coupled to the tractor, thereby minimizing the lifting force required of the power lift mechanism on the tractor, and that the relatively movable elements of the implement, such as the disk gangs, be supported in a manner such that the entire implement can be readily raised to a position free of the ground. Consequently, the main supporting frame structure of the implement must be of sturdy construction and there must be provided a connection with the supported elements, such as disk gangs, which limits the relative vertical movement between the frame and the supported gangs. Furthermore, in the operation of disk harrows it is desirable that the several disk gangs be permitted to rise and fall with the general contour of the ground to provide for uniform penetration of the soil, and that there be provided means for angling the gangs relative to each other, in a manner affording the most efficient soil working arrangement of the gangs under any one of innumerable conditions.

It is, therefore, the primary object of the present invention to provide a novel and improved form of tractor-mounted, tandem disk harrow, including a gang-supporting frame structure affording independent angling of the front and rear gangs and providing for lifting of the entire harrow, as a unit, from its soil working position to an elevated transport position. Another object of the invention is to provide a tandem disk harrow which is adapted for attachment to a three-point lift mechanism on a tractor for elevation thereby to a raised position, and which provides for independent angling of the front and rear gangs, while affording flexible movement of each of the gangs to thereby follow the contour of the ground and, also, to accurately trail behind the tractor.

Other objects and advantages of this invention will be noted as the disclosure progresses with respect to the accompanying drawings, wherein:

Figure 3 is an enlarged plan view of the harrow seen in the preceding figures, with the gangs in their non-angled position;

Figure 4 is an enlarged sectional view taken along the line 4—4 in Figure 3, with parts broken away;

Figure 5 is an exploded, perspective view of a portion of the gang-supporting frame for the harrow, looking generally from rear to front of the harrow;

Figure 6 is an enlarged, fragmentary view, in perspective, of the structure providing one of the connections between a disk-gang and the supporting frame in the illustrated harrow;

Figure 7 is an enlarged perspective view of the connection provided at the inner end of the front gangs.

Figure 1:
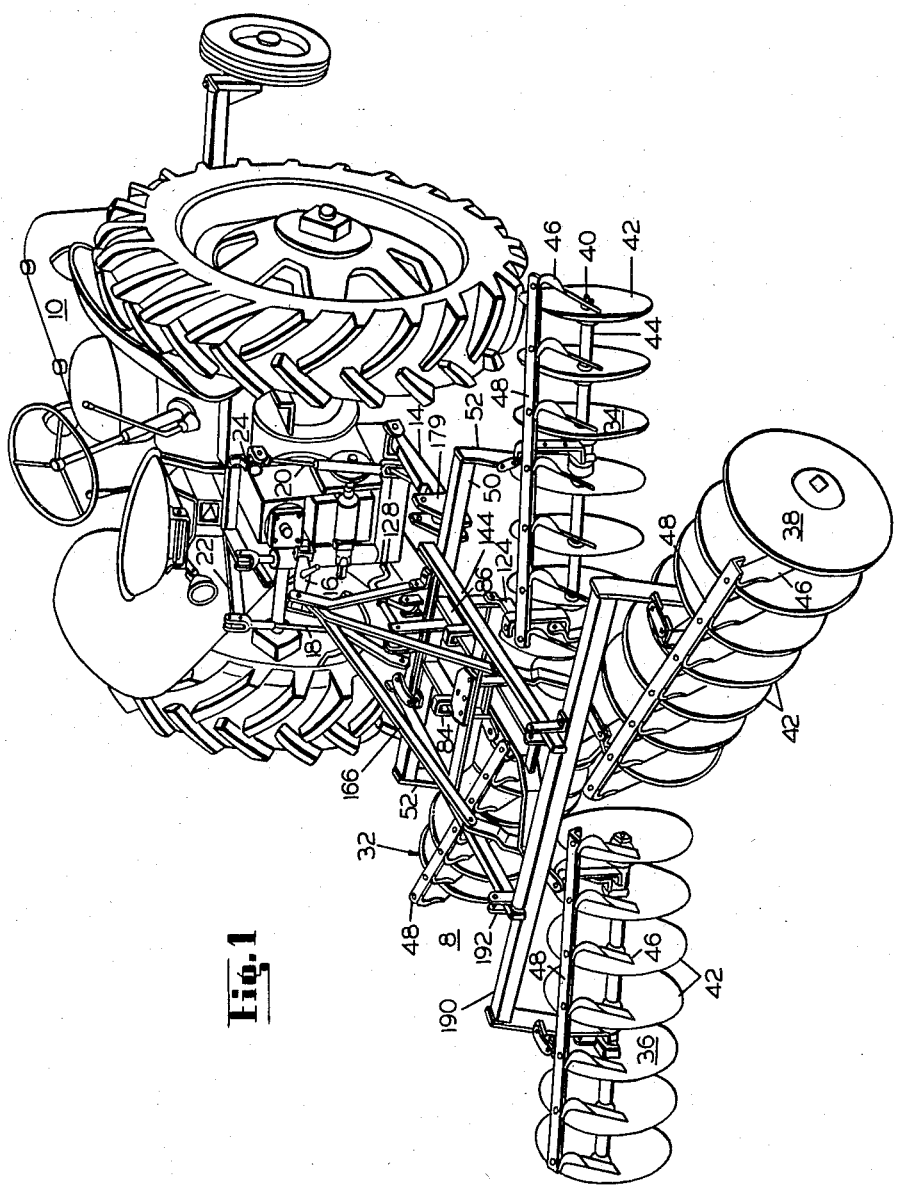
Figure 1 is a perspective view of a tractor-mounted disk harrow constructed in accordance with the present invention.
Figure 2:
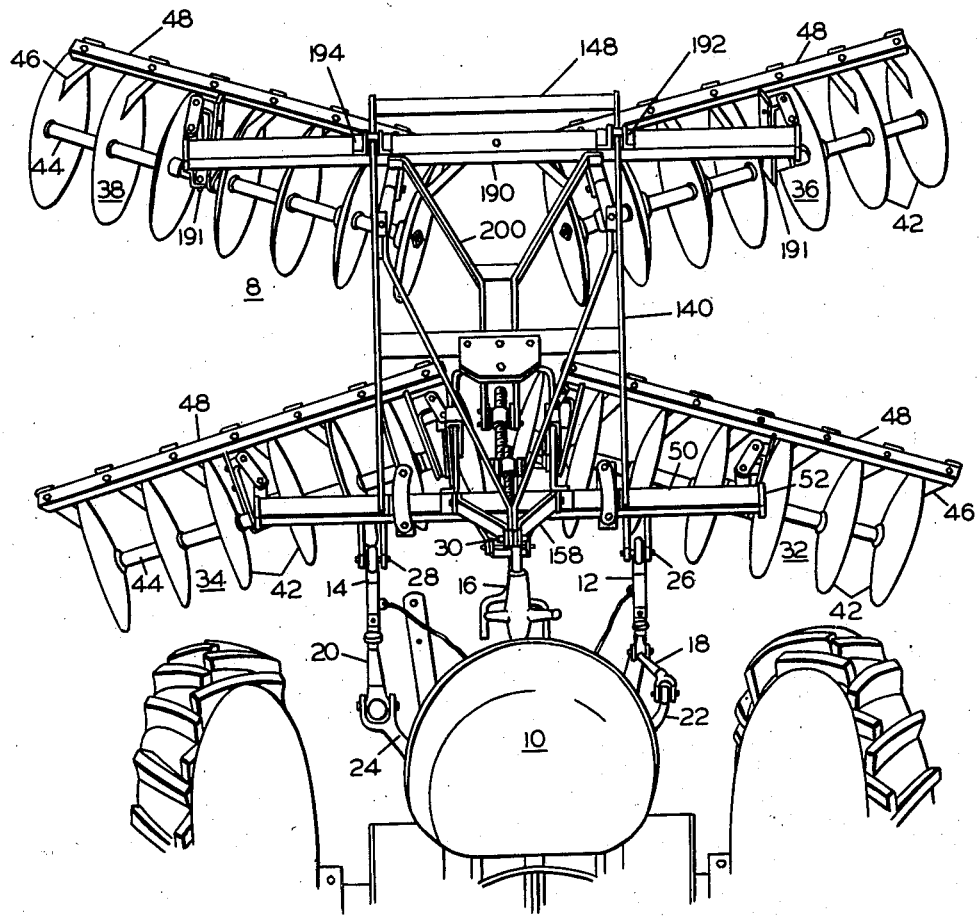
Figure 2 is a plan view of the harrow shown in Figure 1.

Referring to the drawings, it is seen that the apparatus chosen to illustrate the present invention comprises generally a multiple gang disk harrow 8 which is attached in trailing relation to a tractor 10 (Figures 1 and 2) at triangularly spaced hitch elements 12, 14, and 16 which are carried by the tractor. Briefly, the hitch elements 12 and 14 at the base of the triangle each comprise rearwardly extending arms which are pivotally connected at their inner ends to the tractor and which are supported by a pair of links 18 and 20 depending from a pair of power actuated lift arms 22 and 24 on the tractor. One of the links, 20 in this case, is preferably adjustable as to length in order to provide for levelling of the hitch points 12 and 14 relative to the underlying ground. The uppermost hitch element 16 comprises a turnbuckle having a universal connection at its inner end with a fixed point on the tractor. Each of the three hitch elements 12, 14, and 16 preferably include a suitable latch mechanism at their free ends for quick coupling with similarly spaced transverse pins 26, 28, and 30 at the forward end of the harrow.

The illustrated harrow is of the multiple gang, tandem type, having a pair of forward gangs 32 and 34 and a pair of rear gangs 36 and 38. Each of the gangs includes an axle 40 mounting a series of disks 42 which are rotably supported on the axle in uniformly spaced relation by spacers 44 disposed between the disks. In addition, each disk is provided with a scraper 46, the scrapers for each gang being adjustably mounted on a transverse bar 48 which is supported in elevated relation to the rear side of the gang.

The front gangs 32 and 34 are interconnected by a cross bar 50 (Figure 3) having a depending arm 52 rigidly fixed at opposite ends thereof for connection with an intermediate portion of each of the two gangs. As seen also in Figure 6, there is provided a supporting connection between the arm 52 and the outer portion of the adjacent gang, which affords relative movement between the gang and the cross bar 50. This connection includes a split bearing element 54 disposed in encircling relation to one of the spacers 44 and held in place by four bolts 56. A bracket 58 is also held in place on the upper portion of the collar 54 by one pair of the bolts 56, and this bracket supports one end of a stub shaft 60 disposed parallel to the axis of the disk-supporting axle 40. The lower end of the frame arm 52 includes a ball and socket 62 for rotatably and slidably receiving the stub shaft 60.

Another bracket 64 is secured to the other pair of bolts 56 and includes an opening therein for receiving the other end of the stub shaft 60, the latter being held against axial movement by a pair of pins 66. The bracket 64 extends upwardly to provide a support for the scraper bar 48 through a bolted connection with a depending strap 66 fixed to the forward end of the bar 48. Preferably, the connection includes a pivot bolt 68 and a positioning bolt 70 which extends through a slot 72 in the bracket 64, to thereby afford vertical adjustment of the scraper bar 48 about the axis of the pivot bolt 68.

The upper end of the bracket 64 also includes a right angle portion 74 extending generally parallel to the stub shaft 60 and connected at its outer end with a lug 76 on the frame arm 52 by means of a link 78 and a pair of pivot bolts 80. Thus, it is seen that the cross bar 50 is connected to the outer portion of each gang for universal movement, to thereby afford easy angling of the gang as well as vertical movement of the gang about the axis of the ball and socket joint 62 to permit the gangs to follow the contour of the ground.

The inner end of each of the gangs 32 and 34 is similarly supported (Figures 4 and 7) by means including a hanger strap 82 including a downwardly turned, upper and 84 which is slidably carried by a U-shaped member 86 fixed to the bar 50 in rearwardly extending relation. A pair of vertically spaced openings 88 through the overlapping portion 84 of the strap 82 provide for selective positioning of a bolt 89 therethrough to determine the level of the inner end of the gang.

During normal operation the bolt 89 will be positioned to permit vertical movement between the strap 82 and the U-shaped frame member 86.

The lower end of the strap 82 includes a ball and socket joint 90 which is rotatably and slidably mounted on a stub shaft 92 supported between a pair of brackets 94 and 96, as shown in Fig. 7. These brackets are secured, as by bolts 98, to a split bearing 100 which is clamped to the inner-most spacer 44. The bracket 96 also provides a support for the adjacent end of the scraper bar 48 through connection by means of a pivot bolt 102 and an adjusting bolt 104 received by a slot 106 in the bracket 96, in a manner similar to that described for the connection with the outer end of the gang.

The bracket 96 includes a right angle portion 108 at its upper end which is connected with a lug 110 on the strap 82 by a link 112 and a pair of pivot bolts 114. Thus, it is seen that universal movement is also afforded between the inner end of the gang and the supporting strap 82.

The movement provided by the gang supporting brackets at the inner and outer ends of the gang, including the ball and socket joints 62 and 90, the upper end 84 of the hanger strap 82 supporting the inner ends of the gangs, and the angling mechanism carried by the cross bar 50, affords definite advantages in a tractor-mounted harrow of the type described. As a result of this particular manner of construction, there is provided a guided angling movement of the gangs fore and aft with the gangs shifting slightly in an axial direction to maintain their trailing relation to the tractor, the gangs are permitted to undulate in a vertical direction to follow the contour of the ground and thereby provide uniform penetration of the soil, and yet the structure is sufficiently rigid in a vertical direction to allow lifting of the gangs as a unit.

The angling mechanism for the front gangs 32 and 34 includes a bifurcated lever 116, as shown in Figure 4, which is pivotally mounted intermediate its ends on an arm 118 extending forwardly from the cross bar 50. The lever 116 is held in place on the arm 118 by a bolt 120, and the lower end of the lever includes a cross pin 122 which is pivotally connected at opposite ends thereof to a pair of rearwardly extending links 124 fixed at their other ends to the hanger strap 82. The upper end of the lever 116 includes a trunnion 126 for receiving an adjusting crank 128 in rotatable, axially fixed relation thereto. The rearwardly extending end of the crank 128 is threaded for engagement with an internally threaded swivel nut or trunnion 130 mounted between the upwardly extending, spaced apart arms 132 of a bracket which is fixed to the rear side of the bar 50 (Figure 5). Operation of the crank 128 will, therefore, result in a fore and aft movement of the links 124 to angle the gangs 32 and 34 about the pivot axes afforded by the ball and socket joints 62 (Figure 6) at the outer end of the shaft.

Adjustment of the vertical position of the lever 116 relative to the arm 118 is provided by means of a slot 133 in opposite sides of the lever for receiving the pivot bolt 120. Retention of the lever 116 in a selected vertical position relative to the bolt 120 is assisted by a pair of pivotally connected links 134 and 136 which are connected, respectively, to the arm 118 and to a bolt 138 through an upper portion of lever 116. This structure provides for proper adjustment of the pivot lever 116, to afford a horizontal fore and aft movement of the gangs, in either of the two available positions of the hanger straps 82 relative to the frame member 86.

The forward gang bar 50 also supports the forward end of a frame structure 140 (Figures 4 and 5) which interconnects the front and rear gangs. The frame 140 includes a pair of parallel side members 142 and 144 which are rigidly jointed at their forward ends by a transverse member 146 and at their rearward ends by a tubular member 148. The forward end member 146 is disposed along the midportion of the top of the front gang bar 50 and is supported on the latter in a manner affording limited relative movement between the member 146 and the bar 50. More particularly, a short transverse bearing plate 150 is fixed to the gang bar 50 adjacent each of the ends of the frame member 146 and an arcuate shaped tie strap 152 is positioned above each end of the member 146 and held in spaced relation to the associated bearing plate by a spacer 154 and a bolt 156. Thus, limited horizontal swinging movement is permitted between the frame 140 and the front gang bar 50. The general path of the relative swinging movement between the frame 140 and the bar 50 is defined by the curved intermediate portion 157 of the U-frame 86 and a roller 159 positioned on the frame 140. As seen particularly in Figures 4 and 5, the frame 140 includes a cross brace member 161 which has fixed thereto a pair of vertically spaced plates 163 and 164 having aligned openings 165 for receiving a bolt 167 which provides the axis for rotation for the roller 159. Consequently, the roller 159, portion 157 of U-frame 86, and the elements 150 and 152, establish a virtual pivot axis for the relative swinging movement afforded between the harrow frame 140 and the front gang bar 50.

The harrow frame structure 140 also includes a portion of the draft structure for the harrow, comprising a pair of upwardly converging links 158 and 160 (see Figures 3 and 4), which are pivotally connected at their lower ends, as by bolts 162, to the vertically extending flanges of a pair of spaced apart angle members 164 fixed to the upper surface of the end member 146 of the frame 140.

A second pair of links 166 and 168 are pivotally connected by bolts 170 to a rearward portion of the side frame members 142 and 144, respectively, and extend forwardly in converging relation to a pivotal connection 172 with the upper portion of the links 158 and 160. The upper end of the links 158 and 160 include aligned openings 174 for insertion of the pin 30 (Figure 3) which is releasably received by the universal hitch element 16 on the tractor.

As noted particularly in Figure 3, the remainder of the harrow draft structure providing for attachment with a 3-point tractor hitch comprises a pair of brackets 175 and 177 fixed to the cross bar 50 in forwardly extending relation thereto. Each of these brackets include a pair of parallel arms 179 having sets of aligned openings 181 therethrough for insertion of the hitch pins 26 and 28. The lift arms 12 and 14 on the tractor releasably engage the pins 26 and 28, respectively.

The rearward portion of the harrow frame 140 also includes means for connection with the inner ends of the rear gangs 36 and 38, comprising a pair of strap members 176 and 178 which are fixed at their upper ends to the side frame members 142 and 144, respectively, and extend downwardly and rearwardly therefrom. The connecting means on the inner ends of the gangs 36 and 38 are similar to those previously described and each includes a split collar 180 (Figure 4) fixed to the bearing for the inner disk, a pair of brackets 182 and 184 fixed to the collar in vertically extending relation, a stub shaft 186 extending between the brackets, and a ball and socket joint 188 carried by the lower end of the associated one of the straps 176 and 178 and having an axial bore slidably receiving the stub shaft 186.

A gang bar 190, similar to the front gang bar 50, is connected at opposite ends thereof with intermediate portions of the rear gangs 36 and 38, through connections 191 similar to that described above with respect to the outer connections for the front gang bar and, consequently, a detailed description is unnecessary.

The upper surface of the rear gang bar includes a pair of spaced apart guides 192 and 194 for the side members 142 and 144, respectively, of the harrow frame 140. Each guide comprises a pair of angle members spaced to slidably receive the frame members 142 and 144 between their vertically extending flanges. The bottom flanges of each pair of angles are fixed to the bar 190, as by welding, and a pair of aligned openings 196 (Figure 5) through the vertical flanges receives a pin 198 for preventing vertical displacement of the side members 142 and 144 relative to the rear gang bar 190.

The angling mechanism for the rear gangs includes a pull bar 200 which comprises a pair of members 202 and 204 having flanged end portions fixed to spaced apart portions of the forward edge of the gang bar 190, with the members extending forwardly from the gang bar in converging relation. The forward end of the pull bar includes an internally threaded trunnion 206 which receives the threaded end of an adjusting screw crank 207. The forward portion of the crank 207 is mounted in a swivel 208 mounted for movement about a vertical axis provided by a pin 209 and carried by a bracket 210 fixed to the underside of the front gang bar 50. A depending U-shaped bracket 212 (Figure 5) fixed to the cross brace 161 of the harrow frame provides a guide and support for the forward end of the pull bar 200. It is seen therefore, that rotation of the crank 207 will result in fore and aft movement of the pull bar 200 and the rear gang bar 190 affixed thereto. The fore and aft movement of the gang bar 190, which will be guided by the frame guides 192 and 194, will effect an angling of the rear gangs 36 and 38 about the ball and socket joints 188 at their inner end connections with the harrow frame 140.

From the foregoing description of the harrow, it will be seen that there is provided a tandem type, multiple gang harrow which affords independent angling of the front and rear gangs, permits sufficient independent motion of the front and rear gangs to allow the latter to trail the front gangs in turning, and yet provides a sufficiently rigid structure to permit lifting of the harrow, as a unit, to an elevated transport position. The screw crank 128 provides adjustment of the front gangs 32 and 34 by moving the inner ends of the gangs fore and aft about the axis of the ball and socket joints 62 at the connection of the outer portion of the gangs with the end of the gang bar 50. Also, the screw crank 207 provides adjustment of only the rear gangs 36 and 38 through movement of the rear gang bar 190 fore and aft to thereby move the outer ends of the rear gangs about the pivots provided by the ball and socket connections 188 between the inner ends of the gang and the frame 140.

The limited horizontal swinging of the rear gang bar 190 relative to the front gang bar 50, which is afforded by the connection of the frame 140 with the latter bar including the roller 159 and the arcuate tie straps 152, provides sufficient flexibility of the structure to allow the rear gangs to trail the front gangs in making turns, rather than sliding around the turns in the manner normally encountered where the front and rear gangs are rigidly interconnected. Further, this important advantage is achieved through structure which is sufficiently rigid, in a vertical direction, to permit the front and rear gangs to be lifted, as a unit, to a transport position above the ground.

It is to be noted also that the angling of the front and rear gangs is controlled in every respect that is important to the most efficient operation of the harrow. The rearward movement of the inner ends of the front gangs 32 and 34 is guided by the U-shaped frame 86 and the hanger straps 82 in a direction normal to the gang supporting bar 50, so that the angularity of the disks is definitely controllable and not subject to variations due to draft force changes, and so that the angled gang is positioned in the most effective operating position in trailing relation to the tractor. Similarly, the fore and aft movement of the supporting bar 190 for the rear gangs 36 and 38 is guided through the action of the angle members 192 and 194 positioned on top of the bar 190. Consequently, movement of the rear gangs is suitably controlled to conform with the positioning of the front gangs. Moreover, the connection of the frame 140 with the front gang bar 50 cooperates with the angling guide means just referred to so that the front and rear gangs follow the same path in turning. The roller 159 and the guide straps 152 at the forward end of the harrow permit a relative horizontal movement of the front and rear gangs, while the several gangs are restrained against relative lateral movement in the manner described, to thereby define an arcuate path for the harrow which is in closely trailing relation to the tractor.

Then too, the harrow frame structure disclosed herein provides for easy attachment with a three-point hitch mechanism on the tractor in a manner whereby the draft on the rear gangs is primarily transmitted directly to the tractor, rather than through the front gangs, and, also, the weight of the front and rear gangs is distributed so as to minimize the lifting effort required to be exerted by the tractor lift mechanism.

Although shown and described with respect to a tandem disk harrow of the lift type, it is not intended to thereby limit the present invention as various features thereof may be readily adaptable for use in connection with other apparatus.

We claim:

1. A tandem disk harrow having a pair of transverse members disposed in spaced relation fore and aft on the harrow, a plurality of gangs supported on each of said transverse members, a frame structure extending between said transverse members, means connecting said frame structure with the forward transverse member to provide horizontal swinging movement therebetween, means connecting said frame structure with the rear transverse member to provide relative horizontal movement therebetween in a direction normal to said rear transverse member, means for angling the forward gangs including an adjustable connection between the inner ends of said gangs and said forward transverse member, and means for angling the rear gangs including a connection between the inner ends of said rear gangs and said frame structure.

2. In a tandem disk harrow having a pair of spaced apart transverse draft bars each supporting a plurality of disk gangs, and having a frame structure interconnecting the draft bars for vertical movement as a unit, means connecting said frame to one of said draft bars in a manner affording guided swinging movement therebetween in a generally horizontal path, said connecting means including a vertical pivot element fixed along the longitudinal axis of said frame in a position between said transverse draft bars, a transverse strap member fixed to said one draft bar in spaced relation thereto for sliding engagement with said vertical pivot element, a transverse frame member on said interconnecting frame structure and a pair of laterally spaced-apart guide means on said one transverse draft bar engaging similarly spaced portions of said transverse frame member to guide the swinging motion of said frame structure afforded by the relative movement provided between said vertical pivot element and said transverse strap member.

3. In a tandem disk harrow, a rigid frame structure including a forward transverse member and a pair of spaced apart side members extending rearwardly therefrom, a forward cross bar and a rear cross bar each supporting a plurality of disk gangs for horizontal angling movement relative thereto, and means connecting said cross bars with said frame structure in longitudinally spaced relation, said connecting means comprising a laterally movable, vertical pivot affording guided relative swinging movement between said frame and said forward cross bar in a generally horizontal plane, and comprising means affording relative sliding movement between said frame and said rear cross bar in a direction fore and aft of said harrow, said connecting means restraining said frame and said cross bars against relative movement in a vertical direction.

4. A tandem disk harrow comprising a pair of forward gangs pivotally interconnected by a forward cross bar for relative horizontal angling movement, a pair of rearward gangs pivotally interconnected by a rearward cross bar for relative horizontal angling movement, a frame structure uniting said forward and rearward cross bars comprising a transverse member and a pair of side members rigidly fixed thereto in rearwardly extending relation, means positioning said transverse member on an intermediate portion of said forward cross bar for limited horizontal swinging movement relative thereto, said positioning means restraining said transverse member against vertical movement, guide means on said rear cross bar slidably receiving each of said side members in vertically fixed relation to said rear cross bar, means pivotally connecting the rearward portion of said side members with the inner end portion of said rear gangs, angling means for said forward gangs including a lever having an intermediate portion pivotally connected with said forward cross bar, means pivotally connecting one end of said lever with the inner ends of said forward gangs, and means for adjustably moving said lever relative to said forward cross bar, separate angling means for said rearward gangs comprising a pull bar fixed at one end to said rearward cross bar and extending forwardly therefrom, means on said forward cross bar for supporting said pull bar in longitudinally adjustable relation thereto, and draft means on said harrow including a pair of horizontally spaced-apart hitch means fixed to said forward cross bar, and including an additional hitch means fixed to said frame structure above and generally midway between said pair of hitch means.

5. A tandem disk harrow comprising a plurality of front gangs, a forward cross bar disposed above said gangs and having pivotal connections with an outer portion of each of said gangs, angling means carried by said forward cross bar and including means pivotally connected with the inner portions of said front gangs, a plurality of rear gangs, a rear cross bar disposed above said rear gangs and having pivotal connections with an outer portion of each of said gangs, a frame structure interconnecting said front and rear gangs, said frame structure including a transverse member overlying an intermediate section of said forward cross bar and a pair of laterally spaced side members rigidly fixed to said transverse member in rearwardly extending relation thereto, means positioning said transverse frame member on said forward cross bar for limited swinging movement about a generally vertical axis, said positioning means restraining said transverse member against vertical movement relative to said cross bar, guide means on said rear cross bar in position to slidably receive said side frame members, said guide means restraining said side frame members against vertical movement relative to said rear cross bar, adjustable means interconnecting said front and rear cross bars to selectively determine the spacing of said bars, means rigid with said frame structure and having a pivotal connection with the inner end portion of each of said rear gangs, and angling means carried by said front cross bar for moving the inner end portions of said front gangs fore and aft about said pivotal connections at the outer end portions thereof.

6. A tandem disk harrow comprising a plurality of front gangs supported on a forward cross bar for relative angling movement in a generally horizontal path, a plurality of rear gangs supported on a rear cross bar for relative angling movement in a generally horizontal path, a frame structure connected with said forward and rear cross bars and movable relative thereto in a generally horizontal plane to provide swinging movement of said frame structure relative to said forward cross bar about a generally vertical axis and, also, to provide fore and aft movement of said frame structure relative to said rear cross bar, and draft means for said harrow comprising a pair of laterally spaced hitch elements fixed to said forward cross bar and an additional hitch element fixed to said frame structure in a position intermediate and above said pair of hitch elements.

7. In a tandem disk harrow having a plurality of front gangs and a plurality of rear gangs, a front cross bar supporting said front gangs in a manner affording horizontal angling of the gangs relative thereto, a frame extending rearwardly from said front cross bar for connection with said rear gangs, said frame being connected with said front cross bar for guided horizontal swinging movement relative thereto about a laterally movable, vertical pivot axis, and draft means for said harrow comprising a pair of hitch elements fixed to said front cross bar in spaced relation along an intermediate portion thereof and an additional hitch element fixed to said movable frame in a position above and between said pair of hitch elements.

8. A tandem disk harrow having a pair of transverse members disposed in spaced relation fore and aft on the harrow, a plurality of gangs supported on each of said transverse members, a frame structure extending between said transverse members, means connecting said frame structure with the forward transverse member to provide limited horizontal swinging movement therebetween, said connecting means restraining said forward transverse member and frame structure against relative vertical movement, means connecting said frame structure with the rear transverse member to provide horizontal movement therebetween in a direction normal to said rear transverse member while preventing relative vertical movement therebetween, angling means for the forward gangs including a connection between the inner ends of said gangs and said forward transverse member affording fore and aft movement of said inner ends, angling means for the rear gangs including a connection between the inner ends of said rear gangs and said frame structure, and a hitch means for said harrow including a pair of laterally spaced elements fixed to said forward transverse member and a third element fixed to said frame structure in a position above and between said laterally spaced elements.

9. A tandem disk harrow adapted to be connected to a tractor at three points, one of which is disposed above the others, comprising a front gang supported on a forward cross bar, a rear gang supported on a rear cross bar, a frame structure interconnecting said forward and rear cross bars in vertically fixed relation, the connection between said frame and said forward cross bar affording guided horizontal swinging movement therebetween and including a vertical pivot element carried by said frame structure rearwardly of said front cross bar, a transverse member fixed to said front cross bar in a position for sliding engagement with said pivot element, and said connection including a pair of laterally spaced guide means carried by said front cross bar and engaging said frame structure to guide the swinging movement thereof about a vertical pivot remote from said pivot element, and a three point hitch means on said harrow including a pair of hitch elements fixed to said forward cross bar in spaced relation therealong and a third hitch element carried by said frame structure in position above said pair of hitch elements.

10. In a disk harrow having a transverse draft bar, a disk gang including a plurality of disks mounted in spaced relation along a shaft for rotation, a connection between said draft bar and said gang comprising a bearing fixed on said shaft for relative rotation, a bracket secured to said bearing in outwardly projecting relation to said shaft, a stub shaft supported by said bracket in spaced parallel relation to said disk-mounting shaft, a ball slidably mounted on said stub shaft in coaxial relation therewith, an arm fixed to said draft bar in depending relation and having at its outer end a socket-forming portion receiving said ball for relative rotation, whereby universal movement is provided between said arm and said bearing, and means for limiting said universal movement.

11. In a disk harrow having a cross bar and a plurality of gangs supported on the cross bar, each gang comprising a plurality of disks rotatably mounted in spaced relation along an axle member, a connection between said cross bar and each of said gangs comprising an arm fixed to said cross bar in depending relation thereto, a bearing mounted on said axle member for relative rotation, a supporting bracket fixed to said bearing and mounting a stub shaft in parallel spaced relation to said axle member, a ball having a cylindrical bore therethrough and slidably mounted on said stub shaft, the lower end portion of said depending arm including an opening therethrough forming a socket for receiving said ball, whereby said arm is universally connected with said stub shaft in axially slidable relation thereto, and means interconnecting said supporting bracket and said arm to limit the relative movement provided between said arm and said stub shaft.

12. In a disk harrow having a transverse draft bar, a pair of disk gangs each including a plurality of disks mounted in spaced relation along an axial member, said disk gangs being supported on said draft bar for horizontal angling movement relative thereto through connections with the draft bar at the outer and inner end portions of each of the gangs, each of said connections comprising a bearing axially fixed on said axle for relative rotation therebetween, a bracket fixed to said bearing and extending outwardly therefrom, a stub shaft supported by said bracket in spaced parallel relation to said axle, a ball slidably mounted on said stub shaft in coaxial relation therewith, and an arm connected with said draft bar and having a socket-forming portion engaging said ball, the arm provided for the connection at the outer end of each of the gangs extending upwardly to a rigid connection with said transverse draft bar, the arm provided for the connection at the inner end of each of the gangs extending upwardly for connection with the transverse draft bar in a manner affording limited vertical movement therebetween, and relatively movable means carried by said draft bar and connected with the inner end portions of said gangs to provide for horizontal swinging of said gangs about said outer end connections.

References Cited in the file of this patent

UNITED STATES PATENTS

| | | |
|---|---|---|
| Re. 22,627 | McKay | Apr. 3, 1945 |
| 1,322,066 | Sharp | Nov. 18, 1919 |
| 1,421,047 | Ward | June 27, 1922 |
| 1,670,393 | White | May 22, 1928 |
| 1,877,592 | Rogers et al. | Sept. 13, 1932 |
| 2,552,307 | Bowman | May 8, 1951 |
| 2,583,830 | Goble | Jan. 29, 1952 |
| 2,600,331 | Rude | June 10, 1952 |

U. S. DEPARTMENT OF COMMERCE
PATENT OFFICE

CERTIFICATE OF CORRECTION

Patent No. 2,826,886                                                  March 18, 1958

Clarett B. Greeson et al.

It is hereby certified that error appears in the printed specification of the above numbered patent requiring correction and that the said Letters Patent should read as corrected below.

Column 6, line 2, for "gans" read -- gangs --; column 9, line 3, for "vertical" read -- virtual --.

Signed and sealed this 20th day of May 1958.

(SEAL).

Attest:

KARL H. AXLINE
Attesting Officer

ROBERT C. WATSON
Commissioner of Patents